United States Patent
Tong et al.

(10) Patent No.: US 10,107,968 B2
(45) Date of Patent: Oct. 23, 2018

(54) FIBER OPTIC CONNECTOR ASSEMBLY

(71) Applicant: CommScope Telecommunications (China) Co. Ltd., Shanghai (CN)

(72) Inventors: Zhaoyang Tong, Shanghai (CN); Liu Lei, Shanghai (CN); Lin Lin, Shanghai (CN)

(73) Assignee: CommScope Telecommunications (China) Co. Ltd., Shanghai (CN)

( * ) Notice: Subject to any disclaimer, the term of this patent is extended or adjusted under 35 U.S.C. 154(b) by 89 days.

(21) Appl. No.: 15/039,441

(22) PCT Filed: Sep. 2, 2013

(86) PCT No.: PCT/IB2013/058230
§ 371 (c)(1),
(2) Date: May 26, 2016

(87) PCT Pub. No.: WO2014/049469
PCT Pub. Date: Apr. 3, 2014

(65) Prior Publication Data
US 2016/0306122 A1    Oct. 20, 2016

(30) Foreign Application Priority Data

Sep. 28, 2012 (CN) .......................... 2012 1 0371302

(51) Int. Cl.
*G02B 6/38* (2006.01)
(52) U.S. Cl.
CPC .......... *G02B 6/3825* (2013.01); *G02B 6/389* (2013.01); *G02B 6/3821* (2013.01); *G02B 6/3851* (2013.01); *G02B 6/3831* (2013.01)
(58) Field of Classification Search
CPC .. G02B 6/3821; G02B 6/3825; G02B 6/3831; G02B 6/3851; G02B 6/389
See application file for complete search history.

(56) References Cited

U.S. PATENT DOCUMENTS 4,547,039 A * 10/1985 Caron .................. G02B 6/4292
                                                                385/88
4,741,590 A *  5/1988 Caron .................. G02B 6/3825
                                                                385/60
(Continued)

FOREIGN PATENT DOCUMENTS

DE      202 06 797      8/2002
EP      1 394 584       3/2004
JP      2001-033658     2/2001

OTHER PUBLICATIONS

International Search Report for International Application No. PCT/IB2013/058230 dated Dec. 17, 2013 (3 pages).
(Continued)

*Primary Examiner* — Daniel Petkovsek
(74) *Attorney, Agent, or Firm* — Merchant & Gould P.C.

(57) ABSTRACT

A fiber optic connector assembly comprising: a fiber optic connector (110) and a fiber optic adapter (120). The fiber optic connector comprises a ferrule assembly (110) and is simplified to not comprise a case and/or an insertion body of a standard fiber optic connector disposed outside the ferrule assembly. The fiber optic adapter comprises a simplified port (121) adapted to receive the ferrule assembly (110) therein and an elastic piece (130) for holding the ferrule assembly (110) in the simplified port. The elastic piece is disposed in a peripheral wall of the simplified port and clamped on the ferrule assembly to exert an axial elastic force on the ferrule assembly. The fiber optic connector and the fiber optic adapter of the present invention both can be shortened in length, and the fiber optic connector assembly has a simpler structure than that of a standard fiber optic connector assembly.

21 Claims, 9 Drawing Sheets

(56) References Cited

U.S. PATENT DOCUMENTS

| | | | | |
|---|---|---|---|---|
| 4,813,760 | A | 3/1989 | Tanaka et al. | |
| 4,986,625 | A * | 1/1991 | Yamada | G02B 6/3801 385/55 |
| 5,044,719 | A * | 9/1991 | Nakamura | G02B 6/3887 385/136 |
| 5,590,230 | A * | 12/1996 | Cheng | G02B 6/3887 385/136 |
| 5,742,719 | A * | 4/1998 | Birnbaum | G02B 6/3855 385/55 |
| 6,095,695 | A | 8/2000 | Ohtsuka et al. | |
| 6,203,211 | B1 * | 3/2001 | Cheng | G02B 6/3855 385/62 |
| 6,431,762 | B1 | 8/2002 | Taira et al. | |
| 6,637,946 | B2 * | 10/2003 | Cheng | G02B 6/3825 385/77 |
| 7,128,475 | B2 * | 10/2006 | Kesler | G02B 6/4292 385/88 |
| 7,226,215 | B2 * | 6/2007 | Bareel | G02B 6/3821 385/60 |
| 8,192,091 | B2 * | 6/2012 | Hsu | G02B 6/3825 385/147 |
| 8,956,057 | B2 * | 2/2015 | Imaki | G02B 6/36 385/78 |

OTHER PUBLICATIONS

International Written Opinion for International Application No. PCT/IB2013/058230 dated Dec. 17, 2013 (10 pages).

* cited by examiner

FIBER OPTIC CONNECTOR ASSEMBLY

CROSS-REFERENCE TO RELATED APPLICATION

This application is a National Stage of PCT/IB2013/058230 filed on 2 Sep. 2013, which claims the benefit of Chinese Patent Application No. 201210371302.0 filed on Sep. 28, 2012 in the State Intellectual Property Office of China, the disclosures of which are incorporated herein by reference in their entireties To the extent appropriate, a claim of priority is made to each of the above disclosed applications.

BACKGROUND OF THE INVENTION

Field of the Invention

The present invention relates to a fiber optic connector assembly comprising a fiber optic connector and a fiber optic adapter.

Description of the Related Art

FIG. 1 is a cross section view of a conventional standard fiber optic connector 10. As shown in FIG. 1, the standard fiber optic connector 10 mainly comprises a case 11, a fiber alignment ferrule 12, a tail seat 13, a strain relief hoot 14, and a coil spring 15.

Referring to FIG. 1, an end of the fiber alignment ferrule 12 is fixed in the tail seat 13. The fiber alignment ferrule 12 and the tail seat 13 together constitute a ferrule assembly. The ferrule assembly is received in the case 11. The strain-relief boot 14 is sleeved on a rear end of the tail seat 13 and secured to the case 11. The coil spring 15 is received in the case 11.

As shown in FIG. 1, one end of the coil spring 15 is abutted against the tail seat 13, and the other end of the coil spring 15 is abutted against an inner wall of the tail tube 14. As a result, the coil spring 15 exerts an axial spring force on the tail seat 13 and the fiber alignment ferrule 12, so that the fiber alignment ferrule 12 is reliably abutted against a fiber alignment ferrule of a mating fiber optic connector (not shown).

The standard fiber optic connector 10 shown in FIG. 1 is adapted to be inserted into a standard port of a standard fiber optic adapter (not shown).

Although it is not shown, the standard fiber optic connector 10 may further comprise an insertion body disposed inside the case 11 and outside the fiber alignment ferrule 12 and the tail seat 13. After the standard fiber optic connector 10 has been inserted into the standard port of the standard fiber optic adapter, the insertion body may be coupled to a housing of the standard fiber optic adapter.

It can be best seen that the conventional standard fiber optic connector 10 shown in FIG. 1 is complicated in structure because it includes the case 11, the insertion body, and the coil spring 15.

Furthermore, in the conventional standard fiber optic connector 10 shown in FIG. 1, since the coil spring 15 extends a certain length in an axial direction of the standard fiber optic connector 10, the standard fiber optic connector 10 has a larger length in the axial direction. As a result, the standard fiber optic adapter for the standard fiber optic connector 10 also has a larger length. Accordingly, it is very difficult to reduce the size of the standard fiber optic connector and the standard fiber optic adapter.

SUMMARY OF THE INVENTION

The present invention has been made to overcome or alleviate at least one aspect of the above mentioned disadvantages.

Accordingly, it is an object of the present invention to provide a fiber optic connector assembly which has a simpler structure than that of a standard fiber optic connector assembly.

Accordingly, it is another object of the present invention to provide a fiber optic connector which has a simpler structure than that of a standard fiber optic connector.

Accordingly, it is another object of the present invention to provide a fiber optic connector assembly which has a smaller size than that of a standard fiber optic connector assembly.

Accordingly, it is another object of the present invention to provide a fiber optic connector which has a smaller size than that of a standard fiber optic connector.

Accordingly, it is another object of the present invention to provide a fiber optic adapter which has a smaller size than that of a standard fiber optic adapter.

According to an aspect of the present invention, there is provided a fiber optic connector assembly comprising a fiber optic connector and a fiber optic adapter. The fiber optic connector comprising a ferrule assembly and simplified to not comprise a case and/or an insertion body of a standard fiber optic connector disposed outside the ferrule assembly. The fiber optic adapter comprising: a simplified port adapted to receive the ferrule assembly therein; and an elastic piece for holding the ferrule assembly in the simplified port, wherein the elastic piece is disposed in a peripheral wall of the simplified port and clamped on the ferrule assembly to exert an axial elastic force on the ferrule assembly.

In an exemplary embodiment according to the present invention, the ferrule assembly comprising: a fiber alignment ferrule having a through hole in which a fiber is received; and a tail seat in which an end of the fiber alignment ferrule is fixed.

In another exemplary embodiment according to the present invention, a plurality of positioning slots are formed and evenly arranged in an outer peripheral wall of the tail seat; at least one positioning key is formed on an inner wall of a housing of the fiber optic adapter; and the positioning key is configured to mate with the positioning slot to adjust an orientation angle of the ferrule assembly.

In another exemplary embodiment according to the present invention, the tail seat comprising: a first end portion adjacent to the fiber alignment ferrule; a second end portion opposite to the first end portion; and a middle portion between the first and second end portions, wherein the first end portion has a diameter larger than other portions of the tail seat, the elastic piece is clamped on a joint of the middle portion to the first end portion, and the elastic piece is elastically abutted against an end wall of the first end portion.

In another exemplary embodiment according to the present invention, the elastic piece exhibits a U-shape and comprises a pair of elastic arms and a connection part connecting the pair of elastic arms.

In another exemplary embodiment according to the present invention, the elastic piece is made of a thin sheet and adapted to be inserted into a slot formed in the peripheral wall of the simplified port.

In another exemplary embodiment according to the present invention, each of the elastic arms comprising: a base end adjacent to the connection part; a leg end opposite to the base end; and a middle part between the base end and the leg end, wherein the middle part of the elastic arm has an arc clamping surface adapted to be clamped on the middle portion of the tail seat.

In another exemplary embodiment according to the present invention, the middle part has a width less than other parts of the elastic arm to enhance the flexibility of the middle part.

In another exemplary embodiment according to the present invention, the base end of the elastic arm is formed with a shoulder extending outward so as to be engaged in the peripheral wall of the simplified port.

In another exemplary embodiment according to the present invention, the elastic piece further comprising: a handle formed on the connection part to perform an operation of plugging the elastic piece into or out of the peripheral wall of the simplified port.

In another exemplary embodiment according to the present invention, the elastic arm of the elastic piece is formed with a through slot or notch therein to enhance the flexibility of the elastic arm.

In another exemplary embodiment according to the present invention, the elastic piece is formed by bending a round bar.

In another exemplary embodiment according to the present invention, the fiber optic adapter further comprises a standard port adapted to receive the standard fiber optic connector therein; and the standard port is located at a side of the fiber optic adapter opposite to the simplified port.

In another exemplary embodiment according to the present invention, the fiber optic adapter further comprises an alignment sleeve received in a housing of the fiber optic adapter; the fiber alignment ferrule of the simplified fiber optic connector is inserted into the alignment sleeve through the simplified port to be aligned with and abutted against a fiber alignment ferrule of the standard fiber optic connector inserted into the alignment sleeve through the standard port; and a holder is formed in the housing of the fiber optic adapter to hold the alignment sleeve in the housing.

In another exemplary embodiment according to the present invention, an end portion of the holder toward the standard port is formed in an expandable petal-like structure.

In another exemplary embodiment according to the present invention, the simplified port and the housing of the fiber optic adapter are formed into one piece.

In another exemplary embodiment according to the present invention, the simplified port of the fiber optic adapter is a separate component and removably mounted on the housing of the fiber optic adapter.

In another exemplary embodiment according to the present invention, the fiber optic connector assembly is a LC type, a SC type, or a FC type of fiber optic connector assembly.

According to another aspect of the present invention, there is provided a fiber optic adapter group comprising: a housing; a row of simplified ports located at one side of the housing and adapted to receive a row of ferrule assemblies of simplified fiber optic connectors therein; and a row of standard ports located at the other side of the housing and adapted to receive a row of standard fiber optic connectors, wherein an elastic piece for clamping and holding the ferrule assembly in the simplified port is disposed in a peripheral wall of the simplified port.

According to an aspect of the present invention, there is provided a fiber optic adapter comprising: a housing; a simplified port adapted to receive a ferrule assembly of a simplified fiber optic connector therein; and an elastic piece for holding the ferrule assembly in the simplified port, wherein the elastic piece is disposed in a peripheral wall of the simplified port and clamped on the ferrule assembly.

According to an aspect of the present invention, there is provided a fiber optic connector adapted to the above fiber optic adapter, comprising a ferrule assembly. The fiber optic connector is simplified to not comprise a case and/or an insertion body of a standard fiber optic connector disposed outside the ferrule assembly and does not include a spring element of the standard fiber optic connector for exerting an axial spring force on the ferrule assembly.

In various exemplary embodiments of the present invention, the fiber optic connector is simplified to not comprise a case and/or an insertion body of a standard fiber optic connector disposed outside the ferrule assembly. Accordingly, the fiber optic connector of the present invention is simpler in structure than the standard fiber optic connector. Moreover, the fiber optic connector of the present invention does not comprise a coil spring of the standard fiber optic connector for exerting an axial spring force on the ferrule assembly. Instead, an elastic piece disposed in a peripheral wall of a simplified port of a fiber optic adapter is used to replace the coil spring. As a result, the fiber optic connector and the fiber optic adapter of the present invention both can be shortened in length.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
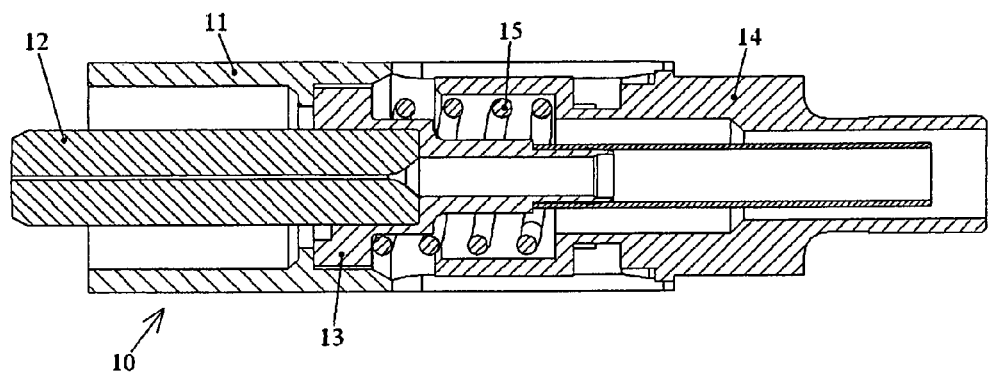
FIG. 1 is a cross section view of a conventional standard fiber optic connector.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
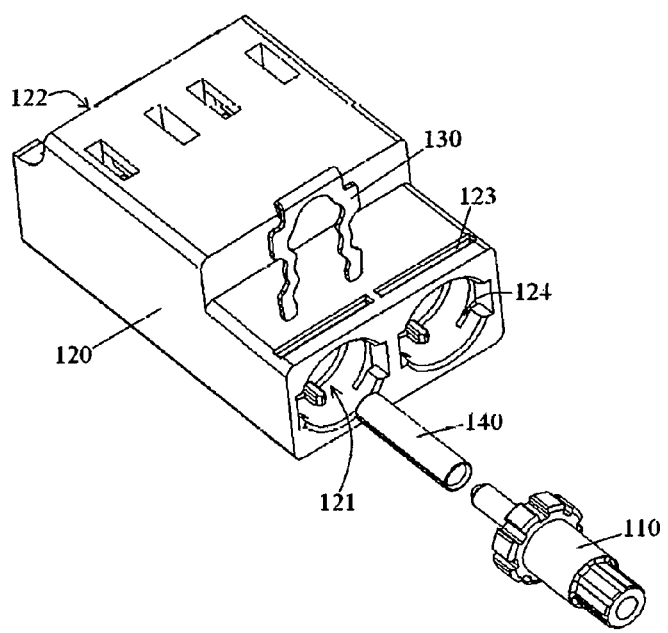
FIG. 2 illustrates an exploded perspective view of a LC f fiber optic connector assembly according to an exemplary embodiment of the present invention.
Figure 3:
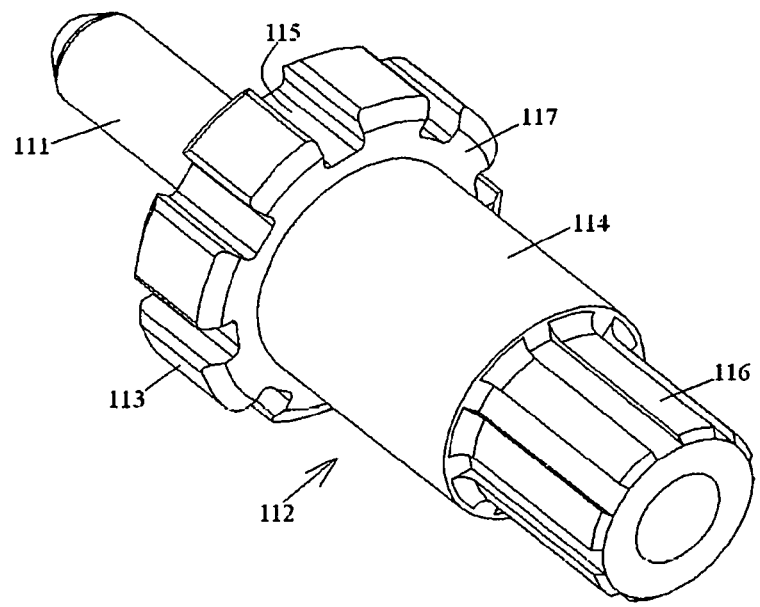
FIG. 3 is an illustrative enlarged view of a ferrule assembly shown in FIG. 2.

FIG. 2 illustrates an exploded perspective view of a LC fiber optic connector assembly according to an exemplary embodiment of the present invention; FIG. 3 is an illustrative enlarged view of a ferrule assembly 110 shown in FIG. 2.

As shown in FIG. 2 and FIG. 3, the fiber optic connector assembly mainly comprises a fiber optic connector and a fiber optic adapter. The fiber optic connector mainly comprises a ferrule assembly 110.

In the illustrative embodiment of FIGS. 2-3, the fiber optic adapter mainly comprises a simplified port 121 adapted to receive the ferrule assembly 110 therein and an elastic piece 130 for holding the ferrule assembly 110 in the simplified port 121. As shown in FIG. 2, the elastic piece 130 is disposed in a peripheral wall of the simplified port 121 and clamped on the ferrule assembly 110 to exert an axial elastic force on the ferrule assembly 110.

Compared with the conventional standard fiber optic connector shown in FIG. 1, the fiber optic connector according to an exemplary embodiment of the present invention, as shown in FIGS. 2-3, is simplified to not comprise a case and/or an insertion body of the standard fiber optic connector disposed outside the ferrule assembly 110. Furthermore, the simplified fiber optic connector does not comprise a coil spring of the standard fiber optic connector for exerting an axial spring force on the ferrule assembly 110. Accordingly, the simplified fiber optic connector of the present invention is simpler in structure than the standard fiber optic connector.

In illustrative embodiments of the present invention, the elastic piece 130 is inserted, in a direction substantial perpendicular to the axial direction of the simplified port, into slots 123, 124 formed in the peripheral wall of the simplified port 121. In this way, the coil spring extending along the axial direction in the standard fiber connector is replaced by the elastic piece 130 vertically disposed in the peripheral wall of the simplified port 121 of the fiber optic adapter of the present invention. As a result, the fiber optic connector and the fiber optic adapter of the present invention both can be greatly shortened in length.

In the illustrative embodiment shown in FIG. 3, the ferrule assembly 110 mainly comprises a fiber alignment ferrule 111 and a tail seat 112. The fiber alignment ferrule 111 has a through hole in which a fiber is received. A rear end of the fiber alignment ferrule 111 is fixed in the tail seat 112.

Figure 8:
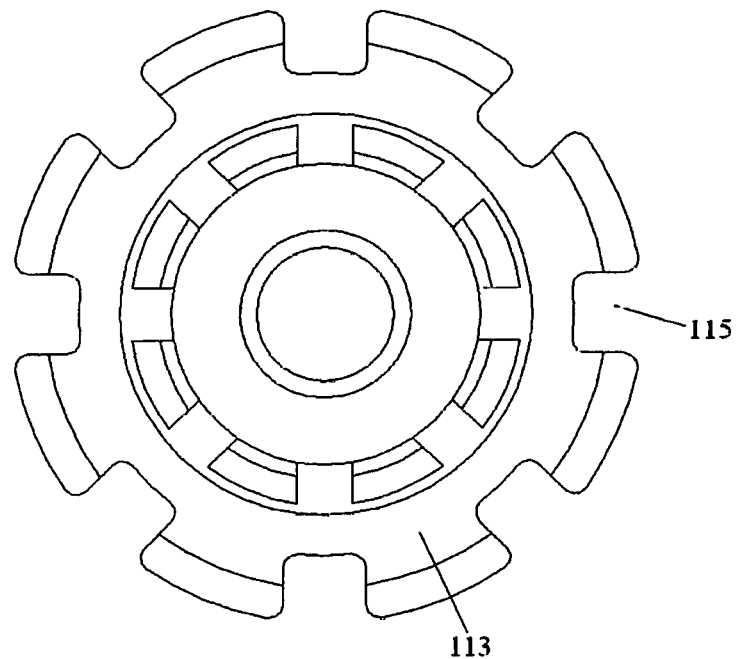
FIG. 8 is an end view of the ferrule assembly of FIG. 3.
Figure 9A:
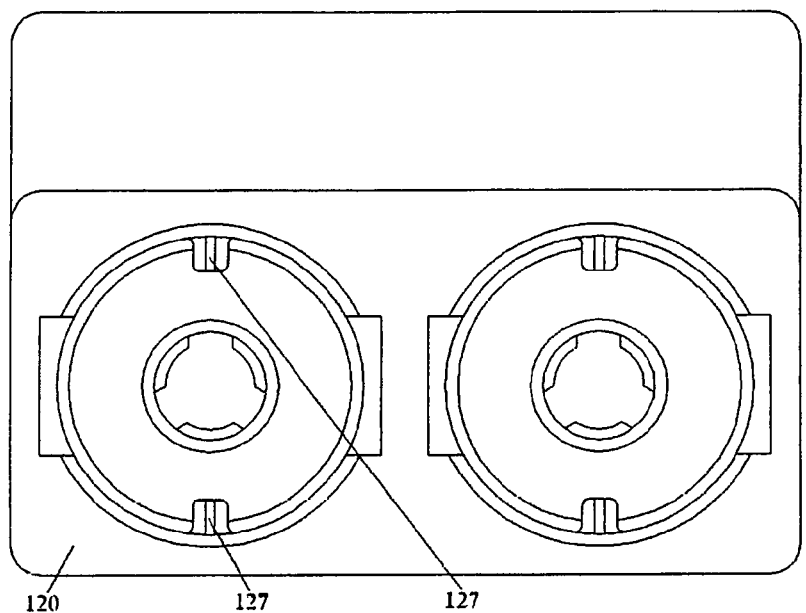
FIG. 9a is an illustrative view of a positioning key on an inner wall of a housing of a fiber optic adapter shown in FIG. 2.
Figure 9B:
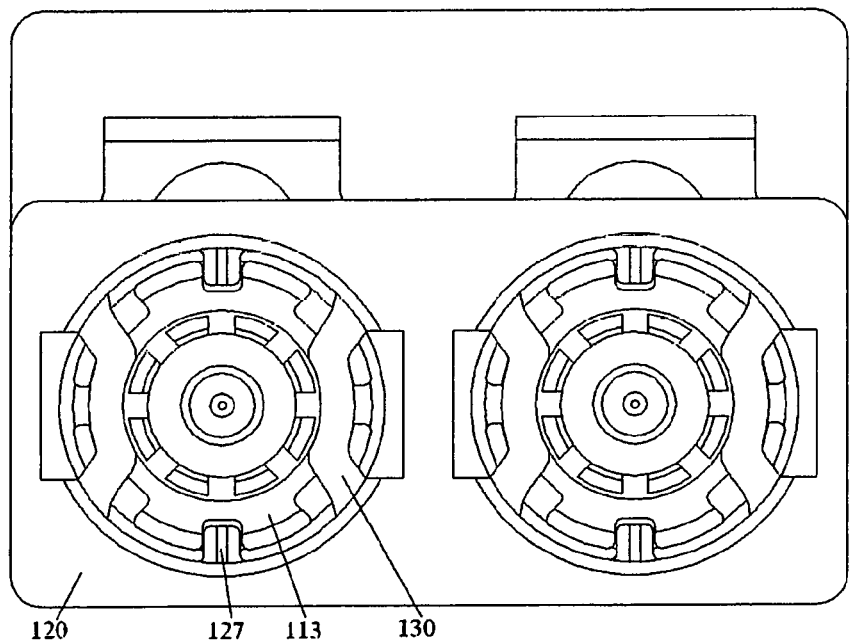
FIG. 9b is an illustrative view showing the positioning key of FIG. 9a fitted in a positioning slot in a tail seat.

FIG. 8 is an end view of the ferrule assembly 110 of FIG. 2; FIG. 9a is an illustrative view of a positioning key 127 on an inner wall of a housing 120 of a fiber optic adapter shown in FIG. 2; FIG. 9b is an illustrative view showing the positioning key 127 of FIG. 9a fitted in a positioning slot 115 in a tail seat 112.

As shown in FIGS. 3, 8, 9a and 9b, in an exemplary embodiment of the present invention, one or more positioning slots 115 are formed and evenly arranged in an outer peripheral wall of the tail seat 112. At least one positioning key 127 is formed on an inner wall of a housing 120 of the fiber optic adapter. The positioning key 127 is configured to mate with the positioning slot 115 to adjust an orientation angle of the ferrule assembly 110.

In the illustrative embodiment of FIGS. 3, 8, 9a and 9b, there are eight positioning slots 115 formed in the tail seat 112, but the present invention is not limited to this, there may be more or less positioning slots 115, for example, six, seven, nine or more. The adjust accuracy of the orientation angle of the fiber core may be improved with the increasing of the number of the positioning slots 115, for example, the adjust accuracy of the orientation angle of the fiber core is 60 degrees if there are six positioning slots 115, and the adjust accuracy of the orientation angle of the fiber core is 30 degrees if there are twelve positioning slots 115.

In the illustrative embodiment of FIGS. 9a and 9b, a pair of positioning keys 127 are formed on the inner wall of the housing 120 of the fiber optic adapter. The pair of positioning keys 127 are arranged to be opposite to each other in a vertical direction. But the present invention is not limited to the illustrative embodiment, for example, a pair of positioning keys opposite to each other in a horizontal direction may be formed on the inner wall of the housing 120 of the fiber optic adapter. In other embodiments of the present invention, there may be one, three or more positioning keys formed on the inner wall of the housing 120 of the fiber optic adapter. If there is a plurality of positioning keys, some of the plurality of positioning keys may be arranged in the horizontal direction, and the other may be arranged in the vertical direction.

As shown in FIG. 3, in an exemplary embodiment of the present invention, the tail seat 112 comprises a first end portion 113 adjacent to the fiber alignment ferrule 111, a second end portion 116 opposite to the first end portion 113, and a middle portion 114 between the first and second end portions 111, 113.

Referring to FIG. 3, the first end portion 113 of the tail seat 112 has a diameter larger than other portions of the tail seat 112, that is, the first end portion 113 of the tail seat 112 becomes an enlarged end portion and has a diameter larger than that of the middle portion 114.

Figure 4:
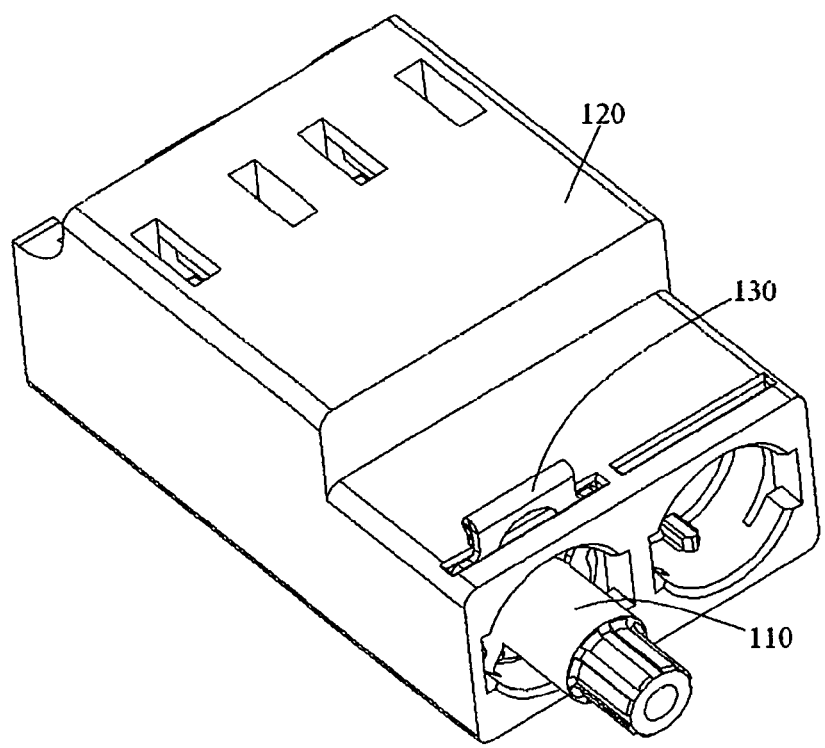
FIG. 4 illustrates an assembled perspective view of a LC fiber optic connector assembly of FIG. 2.
Figure 5:
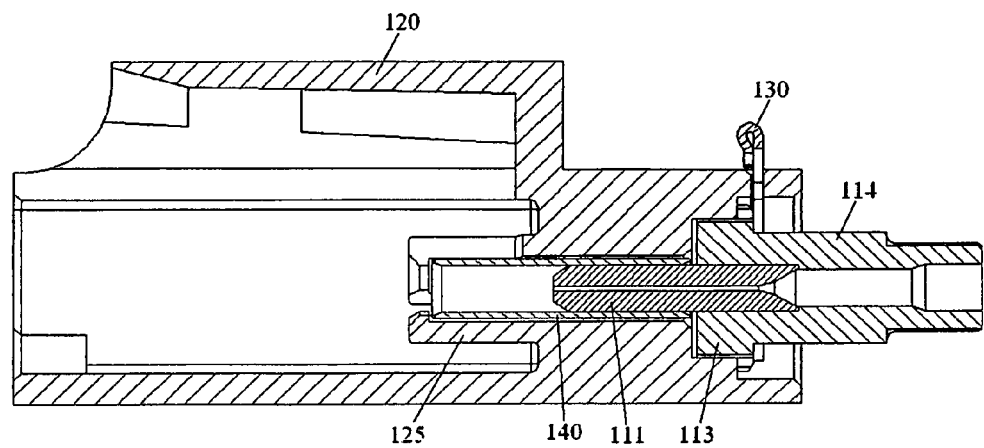
FIG. 5 is a longitudinal cross section view of the LC fiber optic connector assembly of FIG. 4.
Figure 6:
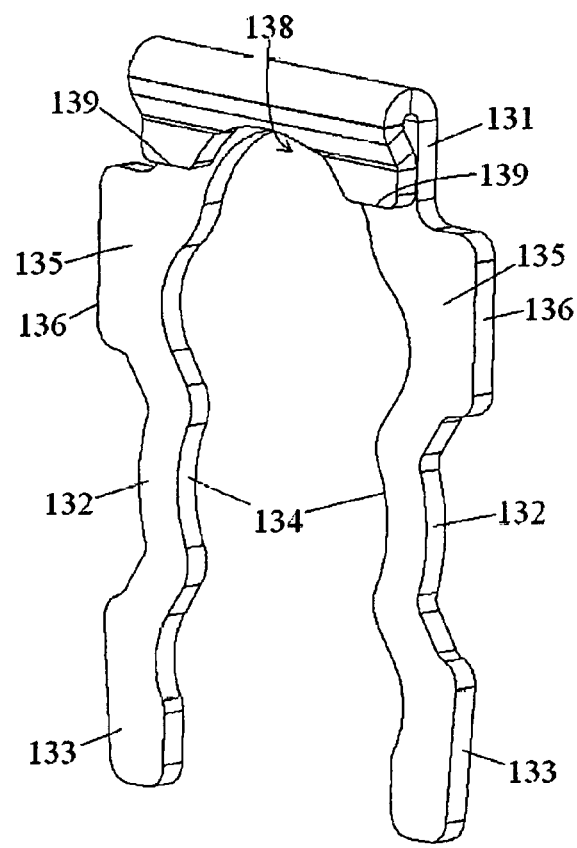
FIG. 6 is an illustrative enlarged view of an elastic piece of the LC fiber optic connector assembly shown in FIG. 2.
Figure 7:
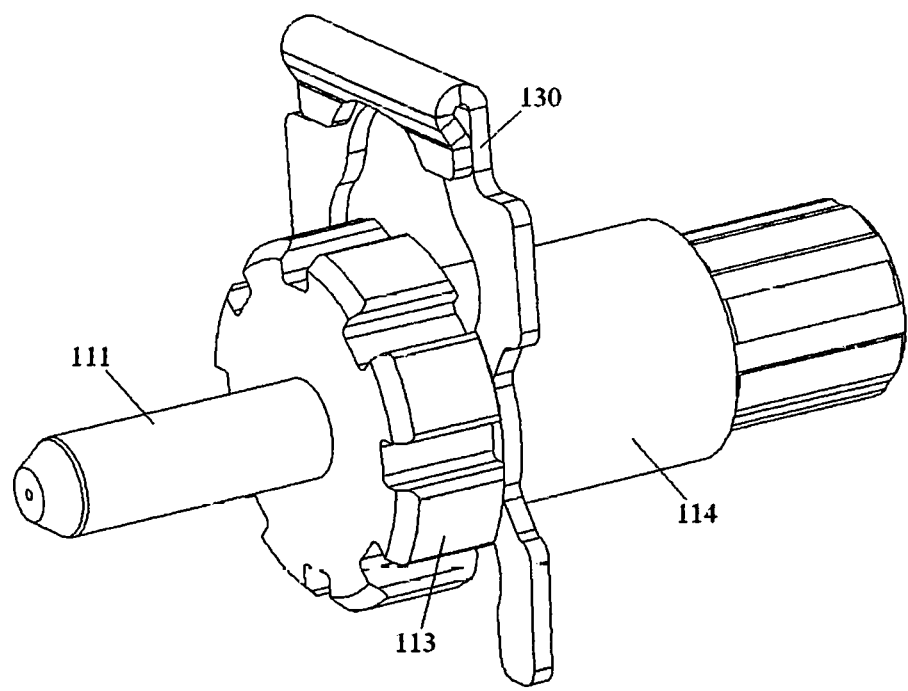
FIG. 7 is an illustrative view showing the elastic piece of FIG. 6 clamped on the ferrule assembly of FIG. 2.

FIG. 4 illustrates an assembled perspective view of a LC fiber optic connector assembly according to an exemplary embodiment of the present invention; FIG. 5 is a longitudinal cross section view of the LC fiber optic connector assembly of FIG. 4; FIG. 6 is an illustrative enlarged view of an elastic piece 130 of the LC fiber optic connector assembly shown in FIG. 2; FIG. 7 is an illustrative view showing the elastic piece 130 of FIG. 6 clamped on the ferrule assembly 110 of FIG. 2.

As shown in FIG. 7, the elastic piece 130 is clamped on a joint of the middle portion 114 and the first end portion 113, and the elastic piece 130 is elastically abutted against an end wall 117 of the first end portion 113 at an approximate end. In this way, as shown in FIG. 4, the elastic piece 130 can prevent the ferrule assembly 110 inserted into the simplified port 121 of the fiber optic adapter from being retreated backward out of the simplified port 121. At the same time, the elastic piece 130 can exert a suitable forward axial elastic force on the ferrule assembly 110, so that the ferrule assembly 110 can be reliably physically abutted against a ferrule assembly of a mating fiber optic connector.

As shown in FIG. 6, in an exemplary embodiment, the elastic piece 130 exhibits a U-shape and comprises a pair of elastic arms and a connection part 131 connecting the pair of elastic arms.

Please refer to FIG. 6 again, the elastic piece 130 is made of a thin sheet. Each of the elastic arms comprises a base end 135 adjacent to the connection part 13, a leg end 133 opposite to the base end 135, and a middle part 132 between the base end 135 and the leg end 133. The middle part 132 of the elastic arm is formed with an arc clamping surface 134 adapted to be clamped on the middle portion 114 of the tail seat 112.

Referring to FIG. 6, the middle part 132 has a width less than that of other parts of the elastic arm to enhance the flexibility of the middle part 132. The base end 135 of the elastic arm is formed with a shoulder 136 extending outward so as to be engaged in the peripheral wall of the simplified port 121. The shoulder 136 can increase the support strength of the base end 135 of the elastic arm.

As shown in FIG. 6, the elastic piece 130 further comprises a handle 138 formed on the connection part 131 to perform an operation of plugging the elastic piece 130 into or out of the peripheral wall of the simplified port 121.

In the illustrative embodiment of FIG. 6, a stop feature 139 may be formed at the base end 135 of the elastic piece 130. The stop feature 139 is constructed to prevent the elastic piece 130 from being further inserted into the slots 123, 124 of the simplified port 121.

Figure 6A:
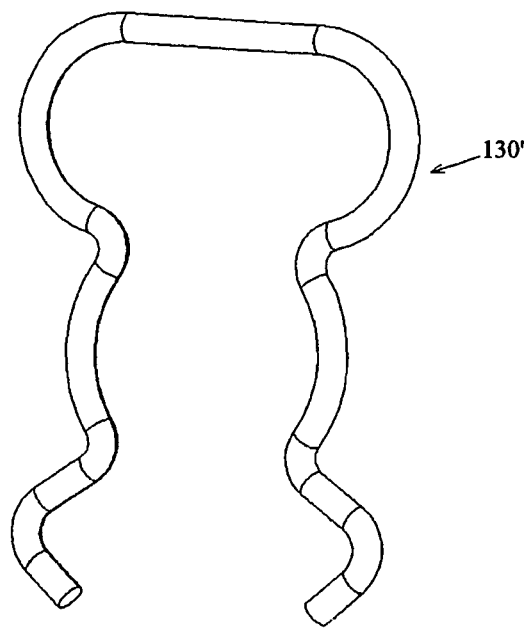
FIG. 6a illustrates another elastic piece according to another embodiment of the present invention.

FIG. 6a illustrates another elastic piece 130' according to another embodiment of the present invention.

As shown in FIG. 6a, the elastic piece 130' is formed by bending a round bar, instead of the thin sheet shown in FIG. 6. The elastic piece 130' may be inserted into holes (not shown) formed in the peripheral wall or the simplified port 121.

Figure 6B:
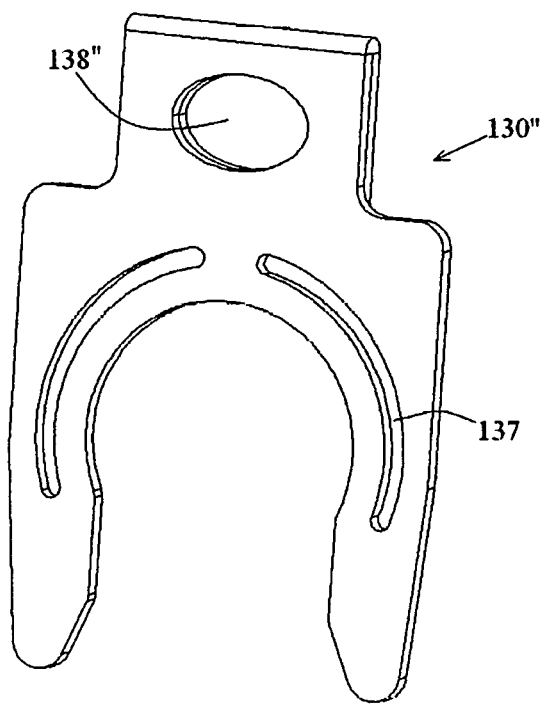
FIG. 6b illustrates yet another elastic piece according to yet another embodiment of the present invention.

FIG. 6b illustrates yet another elastic piece 130" according to yet another embodiment of the present invention.

As shown in FIG. 6b, the elastic piece 130" is made of a thin sheet and has a different shape from the elastic piece 130 of FIG. 6. In addition, a circle hole 138" is formed in the connection part of the elastic piece 130", and the circle hole 138" functions as the handle 138 of FIG. 6 to perform an operation of plugging the elastic piece 130" into or out of the peripheral wall of the simplified port 121.

As shown in FIG. 6b, the elastic arm of the elastic piece 130" is formed with a through slot(s) or notch(s) 137 in the middle part thereof to enhance the flexibility of the elastic arm.

Back to FIG. 2, in an exemplary embodiment of the present invention, the fiber optic adapter may further comprise a standard port 122 adapted to receive the standard fiber optic connector therein. As shown in FIG. 2, the standard port 122 is located at a side of the fiber optic adapter opposite to the simplified port 121, but the present invention is not limited to this, the standard port 122 may be located at a side of the fiber optic adapter same as the simplified port 121.

As shown in FIGS. 2, 4 and 5, the fiber optic adapter further comprises an alignment sleeve 140 received in the housing 120 of the fiber optic adapter. The fiber alignment ferrule 111 of the simplified fiber optic connector is inserted into the alignment sleeve 140 through the simplified port 121 to be aligned with and abutted against a fiber alignment ferrule of the standard fiber optic connector (not shown) inserted into the alignment sleeve 140 through the standard port 122.

Figure 10:
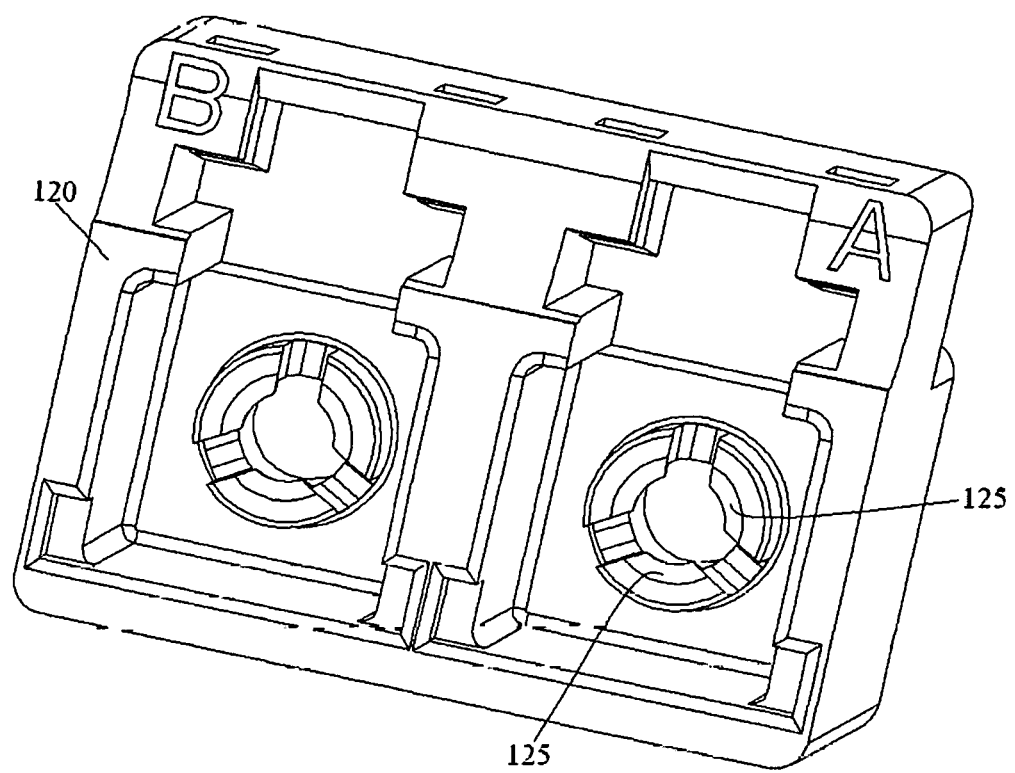
FIG. 10 is an illustrative structure view of an end portion of a holder of an alignment sleeve in the housing of the fiber optic adapter toward a standard port.

FIG. 10 is an illustrative structure view of an end portion of a holder 125 of the alignment sleeve 140 in the housing 120 of the fiber optic adapter toward the standard port 122.

As shown in FIGS. 2, 4, 5 and 10, a holder 125 is formed in the housing 120 of the fiber optic adapter to hold the alignment sleeve 140 in the housing 120. The end portion of the holder 125 toward the standard port 122 is formed in an expandable petal-like structure. In this way, the alignment sleeve 140 held in the holder 125 may be easily replaced with another one when it is broken.

In the illustrative embodiment of FIG. 2, the simplified port 121 and the housing 120 of the fiber optic adapter are formed into one piece. However, the present invention is not limited to this, the simplified port 121 of the fiber optic adapter may be a separate component and removably mounted on the housing 120 of the fiber optic adapter.

Figure 11:
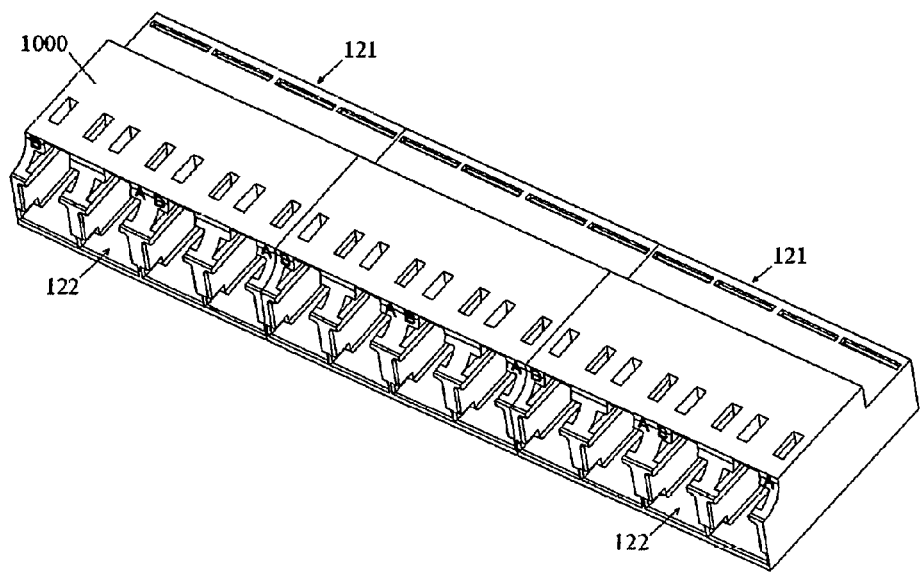
FIG. 11 shows a LC fiber optic adapter group according to an embodiment of the present invention.

FIG. 11 shows a LC fiber optic adapter group according to an embodiment of the present invention.

As shown in FIG. 11, the fiber optic adapter group mainly comprising: a housing 1000; a row of simplified ports 121 located at one side of the housing 1000 and adapted to receive a row of ferrule assemblies 110 of simplified fiber optic connectors therein as mentioned in various embodiments of the present invention; and a row of standard ports 122 located at the other side of the housing 1000 and adapted to receive a row of standard fiber optic connectors.

Similar as the simplified port 121 of the fiber optic adapter shown in FIGS. 2-10, elastic pieces 130 are disposed in peripheral walls of the simplified ports 121 of the fiber optic adapter group of FIG. 11 to clamp and hold the ferrule assemblies 110 in the simplified ports 121.

As shown in FIG. 11, the row of simplified ports 121 of the fiber optic adapter group are arranged in a straight line, and the row of standard ports 122 are also arranged in a straight line.

Figure 12:
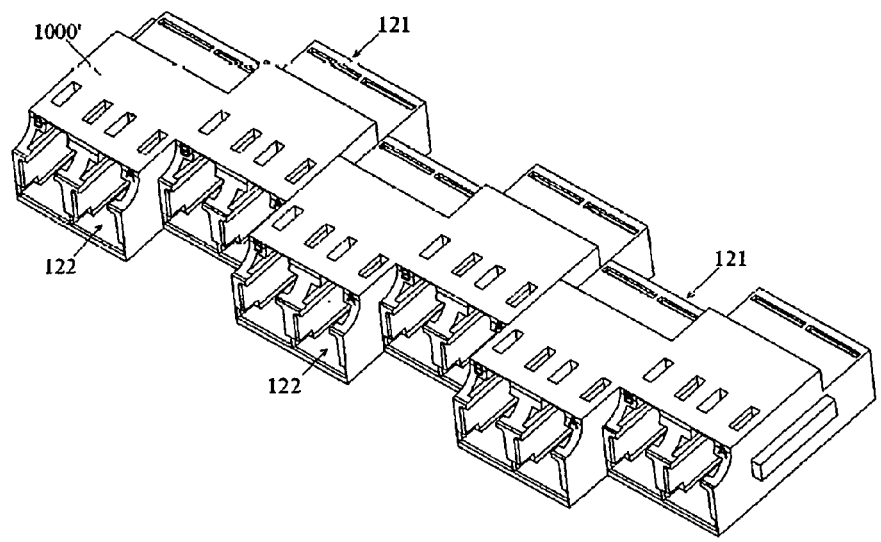
FIG. 12 shows a LC fiber optic adapter group according to another embodiment of the present invention.

FIG. 12 shows a LC fiber optic adapter group according to another embodiment of the present invention.

As shown in FIG. 12, the fiber optic adapter group mainly comprising: a housing 1000'; a row of simplified ports 121 located at one side of the housing 1000' and adapted to receive a row of ferrule assemblies 110 of simplified fiber optic connectors therein as mentioned in various embodiments of the present invention; and a row of standard ports 122 located at the other side of the housing 1000' and adapted to receive a row of standard fiber optic connectors.

Similar as the simplified port 121 of the fiber optic adapter shown in FIGS. 2-10, elastic pieces 130 are disposed in peripheral walls of the simplified ports 121 of the fiber optic adapter group of FIG. 12 to clamp and hold the ferrule assemblies 110 in the simplified ports 121.

As shown in FIG. 12, the row of simplified ports 121 of the fiber optic adapter group arc arranged in a staggered manner, and the row of standard ports 122 are also arranged in a staggered manner.

Figure 13:
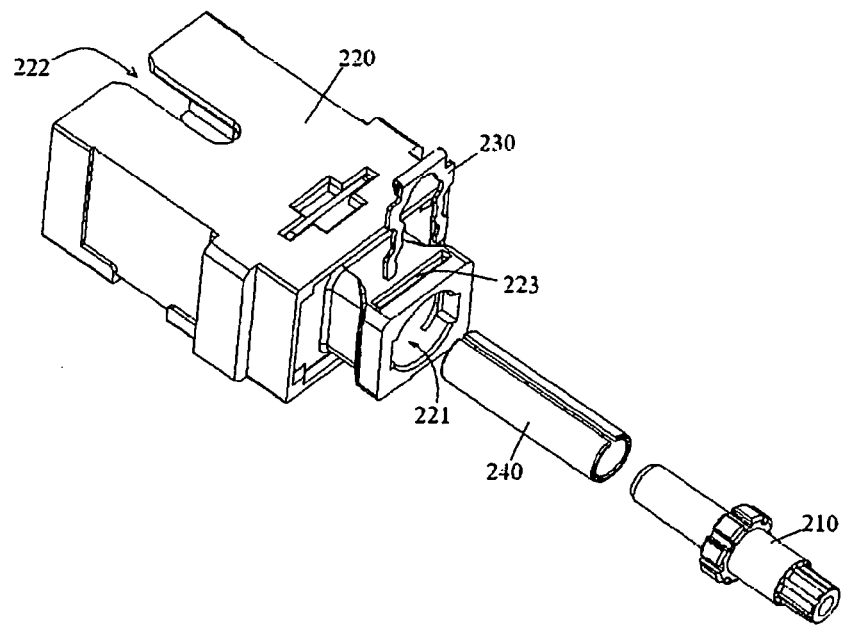
FIG. 13 illustrates an exploded perspective view of a SC fiber optic connector assembly according to another exemplary embodiment of the present invention.

FIG. 13 illustrates an exploded perspective view of a SC fiber optic connector assembly according to another exemplary embodiment of the present invention.

As shown in FIG. 13, the SC fiber optic connector assembly mainly comprises a simplified SC fiber optic connector and a SC fiber optic adapter. The SC fiber optic adapter mainly comprises a simplified port 221 adapted to receive the ferrule assembly 210 therein and an elastic piece 230 for holding the ferrule assembly 210 in the simplified port 221.

As shown in FIG. 13, the elastic piece 230 is disposed in a peripheral wall of the simplified port 221 and clamped on the ferrule assembly 210 to exert an axial elastic force on the ferrule assembly 210.

The SC fiber optic connector assembly of FIG. 13 is different from the LC fiber optic connector assembly of FIGS. 2-10 in that the simplified port 221 is a separate component and removably mounted to the housing 220.

Similar as the LC fiber optic connector assembly of FIGS. 2-10, the SC fiber optic connector of FIG. 13 is also simplified to not comprise a case and/or an insertion body of the standard fiber optic connector disposed outside the ferrule assembly 210. Furthermore, the SC fiber optic connector of FIG. 13 does not comprise a coil spring of the standard fiber optic connector for exerting an axial spring force on the ferrule assembly 210. Accordingly, the SC fiber optic connector of FIG. 13 is simpler in structure than the standard fiber optic connector Also, in the illustrative embodiment of FIG. 13, the coil spring extending along the axial direction in the standard fiber connector is replaced by an elastic piece 230 disposed, in a direction substantial perpendicular to the axial direction of the simplified port 221, in a peripheral wall of the simplified port 221 of the SC fiber optic adapter. As a result, the SC fiber optic connector and the SC fiber optic adapter of FIG. 13 both can be greatly shortened in length.

Also, as shown in FIG. 13, the SC fiber optic adapter further comprises a standard port 222 adapted to receive the standard fiber optic connector therein. The standard port 222 is located at a side of the SC fiber optic adapter opposite to the simplified port 221.

Other configurations of the SC fiber optic connector assembly of FIG. 13 are similar to those of the LC fiber optic connector assembly of FIGS. 2-10, therefore, descriptions about these are omitted herein.

Figure 14:
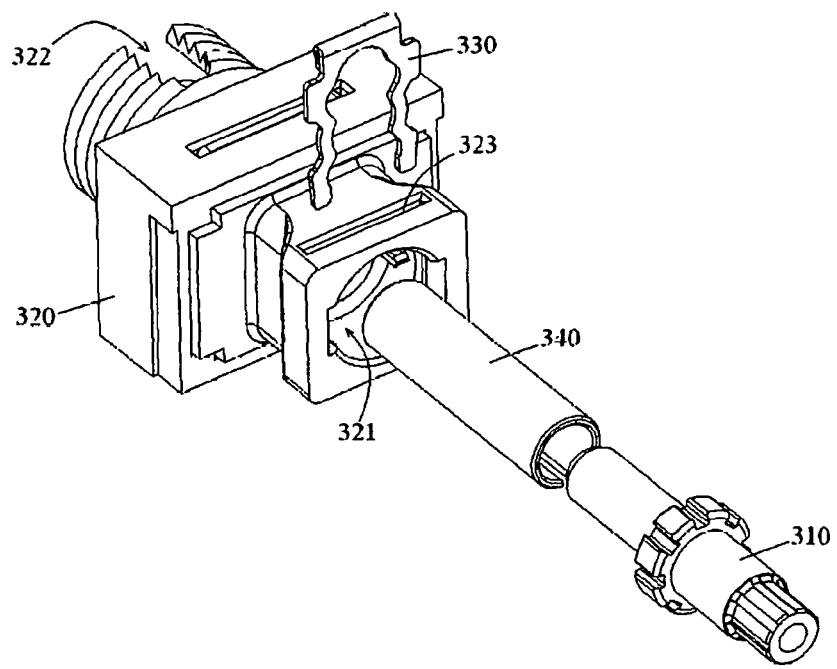
FIG. 14 illustrates an exploded perspective view of a FC fiber optic connector assembly according to another exemplary embodiment of the present invention.

FIG. 14 illustrates an exploded perspective view of a FC fiber optic connector assembly according to another exemplary embodiment of the present invention.

As shown in FIG. 14, the FC fiber optic connector assembly mainly comprises a simplified FC fiber optic connector and a FC fiber optic adapter. The FC fiber optic adapter mainly comprises a simplified port 321 adapted to receive the ferrule assembly 310 therein and an elastic piece 330 for holding the ferrule assembly 310 in the simplified port 321.

As shown in FIG. 14, the elastic piece 330 is disposed in a peripheral wall of the simplified port 321 and clamped on the ferrule assembly 310 to exert an axial elastic force on the ferrule assembly 310.

The FC fiber optic connector assembly of FIG. 14 is different from the LC fiber optic connector assembly of FIGS. 2-10 in that the simplified port 321 is a separate component and removably mounted to the housing 320.

Similar as the LC fiber optic connector assembly of FIGS. 2-10, the FC fiber optic connector of FIG. 14 is also simplified to not comprise a case and/or an insertion body of the standard fiber optic connector disposed outside the ferrule assembly 310. Furthermore, the FC fiber optic connector of FIG. 14 does not comprise a coil spring of the standard fiber optic connector for exerting an axial spring force on the ferrule assembly 310. Accordingly, the FC fiber optic connector of FIG. 14 is simpler in structure than the standard fiber optic connector.

Also, in the illustrative embodiment of FIG. 14, the coil spring extending along the axial direction in the standard fiber connector is replaced by an elastic piece 330 disposed, in a direction substantial perpendicular to the axial direction of the simplified port 321, in a peripheral wall of the simplified port 321 of the FC fiber optic adapter. As a result, the FC fiber optic connector and the FC fiber optic adapter of FIG. 14 both can be greatly shortened in length.

Also, as shown in FIG. 14, the FC fiber optic adapter further comprises a standard port 322 adapted to receive the standard fiber optic connector therein. The standard port 322 is located at a side of the FC fiber optic adapter opposite to the simplified port 321.

Other configurations of the FC fiber optic connector assembly of FIG. 14 are similar to those of the LC fiber optic connector assembly of FIGS. 2-10, therefore, descriptions about these are omitted herein.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic connector assembly comprising:
   a fiber optic connector including a fiber alignment ferrule carried by a body and a radial wall extending radially outwardly from the body;
   a fiber optic adapter having a length extending between first and second ends, the fiber optic adapter defining a first port at the first end and a second port at the second end, the fiber optic adapter having a peripheral wall around the second port, the peripheral wall defining a slot separate from the second port, the slot providing access to an interior of the second port; and
   an elastic piece sized to extend into the slot to hold the fiber optic connector at the second port, the elastic piece being sized and shaped to clamp on the body of the fiber optic connector so that the radial wall extends between the elastic piece and the first port, the elastic piece having a handle that extends through the slot to an exterior of the fiber optic adapter.

2. The fiber optic connector assembly according to claim 1, wherein the fiber alignment ferrule has a through hole in which a fiber is received; and
   wherein the body includes a tail seat in which an end of the fiber alignment ferrule is fixed.

3. The fiber optic connector assembly according to claim 2, wherein a plurality of positioning slots are formed and evenly arranged in the peripheral wall of the tail seat; wherein at least one positioning key is formed on an inner wall of a housing of the fiber optic adapter; and wherein the positioning key is configured to mate with the positioning slot to adjust an orientation angle of the fiber optic connector.

4. The fiber optic connector assembly according to claim 2, wherein the tail seat comprises:
   a first end portion adjacent to the fiber alignment ferrule;
   a second end portion opposite to the first end portion; and a middle portion between the first and second end portions,
wherein the first end portion has a diameter larger than that of other portions of the tail seat, and
the elastic piece is clamped on a joint of the middle portion and the first end portion.

5. The fiber optic connector assembly according to claim 1, wherein the elastic piece exhibits a U-shape and comprises a pair of elastic arms and a connection part connecting the pair of elastic arms.

6. The fiber optic connector assembly according to claim 5, wherein the elastic piece is made of a sheet.

7. The fiber optic connector assembly according to claim 5, wherein each of the elastic arms comprising:
a base end adjacent to the connection part;
a leg end opposite to the base end; and
a middle part between the base end and the leg end,
wherein the middle part of the elastic arm has an arc clamping surface adapted to be clamped on the fiber optic connector.

8. The fiber optic connector assembly according to claim 7, wherein the middle part of each elastic arm has a width less than that of other parts of the elastic arm to enhance the flexibility of the middle part.

9. The fiber optic connector assembly according to claim 7, wherein the base end of each elastic arm is formed with a shoulder extending outward so as to be engaged in the peripheral wall of the adapter at the second port.

10. The fiber optic connector assembly according to claim 5, wherein the handle is formed on the connection part to perform an operation of plugging the elastic piece into or out of the peripheral wall of the second port.

11. The fiber optic connector assembly according to claim 5, wherein each elastic arm of the elastic piece is formed with a through slot or notch therein to enhance the flexibility of the elastic arm.

12. The fiber optic connector assembly according to claim 5, wherein the elastic piece is formed by bending a round bar.

13. The fiber optic connector assembly according to claim 1, wherein the fiber optic adapter further comprises an alignment sleeve received in a housing of the fiber optic adapter; wherein the fiber alignment ferrule of the fiber optic connector is inserted into the alignment sleeve through the second port to be aligned with and abutted against a fiber alignment ferrule of another fiber optic connector inserted into the alignment sleeve through the first port; and wherein a holder is formed in the housing of the fiber optic adapter to hold the alignment sleeve in the housing.

14. The fiber optic connector assembly according to claim 13, wherein an end portion of the holder toward the first port is formed in an expandable structure.

15. The fiber optic connector assembly according to claim 13, wherein the second port and the housing of the fiber optic adapter are formed into one piece.

16. The fiber optic connector assembly according to claim 13, wherein the second port of the fiber optic adapter is a separate component and removably mounted on the housing of the fiber optic adapter.

17. The fiber optic connector assembly according to claim 13, wherein the another fiber optic connector is a LC, a SC, or a FC fiber optic connector.

18. The fiber optic connector assembly according to claim 1, wherein the first port of the fiber optic adapter is an LC, SC, or FC port.

19. The fiber optic connector assembly according to claim 1, wherein each of the first and second ports extend inwardly along a depth from the respective end of the fiber optic adapter, the depth of the first port being substantially larger than the depth of the second port.

20. The fiber optic connector assembly according to claim 1, wherein the elastic piece includes a connection part connecting a pair of elastic arms, wherein the handle is formed on the connection part to perform an operation of plugging the elastic piece into or out of the peripheral wall of the second port, and wherein a base end of each elastic arm is formed with a shoulder extending outward so as to be engaged in the peripheral wall of the adapter at the second port.

21. The fiber optic connector assembly according to claim 1, wherein the fiber optic adapter also defines a third port at the second end, the fiber optic adapter having another peripheral wall around the third port, the another peripheral wall defining a second slot separate from the third port, the second slot providing access to an interior of the third port; and wherein a second elastic piece is sized to extend into the second slot to hold another fiber optic connector at the third port.

* * * * *